United States Patent [19]

Fiddelaers et al.

[11] Patent Number: 5,776,390
[45] Date of Patent: Jul. 7, 1998

[54] METHOD OF FORMING BOARDS OF FOAM POLYOLEFIN USING NEEDLE PUNCHING TO RELEASE BLOWING AGENT

[75] Inventors: Martin Fiddelaers, Genk; Leon Swennen, Bilzen, both of Belgium

[73] Assignee: Scriptoria N.V., Wellen, Belgium

[21] Appl. No.: 678,949

[22] Filed: Jul. 12, 1996

Related U.S. Application Data

[60] Continuation of Ser. No. 404,264, Mar. 14, 1995, abandoned, which is a division of Ser. No. 87,404, Jul. 8, 1993, abandoned.

[30] Foreign Application Priority Data

Dec. 15, 1992 [EP] European Pat. Off. ............ 92121283

[51] Int. Cl.$^6$ ............................................................ B29C 44/20
[52] U.S. Cl. .................... 264/50; 264/53; 264/155; 264/156; 264/232
[58] Field of Search ............................ 264/50, 51, 53, 264/155, 156, 48, 232

[56] References Cited

U.S. PATENT DOCUMENTS

| 3,396,616 | 8/1968 | Wright . |
| 3,532,588 | 10/1970 | Newman . |
| 3,573,152 | 3/1971 | Wiley et al. . |
| 3,661,674 | 5/1972 | Higgs et al. . |
| 3,682,739 | 8/1972 | Tesch et al. . |
| 3,817,671 | 6/1974 | Lemelson . |
| 3,919,446 | 11/1975 | Smarook . |
| 3,966,526 | 6/1976 | Doerfling . |
| 4,097,210 | 6/1978 | Romanillos . |
| 4,183,984 | 1/1980 | Browers et al. . |
| 4,197,343 | 4/1980 | Forsythe . |
| 4,199,639 | 4/1980 | Ronc . |
| 4,201,818 | 5/1980 | Rohn . |
| 4,323,528 | 4/1982 | Collins . |
| 4,368,276 | 1/1983 | Park . |
| 4,395,510 | 7/1983 | Park . |
| 4,485,193 | 11/1984 | Rubens et al. . |
| 4,618,532 | 10/1986 | Volland et al. ............... 428/304.4 |
| 4,663,361 | 5/1987 | Park . |
| 4,824,720 | 4/1989 | Malone . |
| 4,923,547 | 5/1990 | Yamaji et al. . |
| 4,931,484 | 6/1990 | Hovis et al. . |
| 5,055,341 | 10/1991 | Yamaji et al. . |
| 5,059,376 | 10/1991 | Pontiff et al. . |
| 5,059,631 | 10/1991 | Hovis et al. . |
| 5,066,531 | 11/1991 | Legg et al. . |
| 5,124,097 | 6/1992 | Malone . |
| 5,132,171 | 7/1992 | Yoshizawa et al. . |
| 5,225,451 | 7/1993 | Rogers et al. . |
| 5,348,795 | 9/1994 | Park ............................. 428/220 |
| 5,411,689 | 5/1995 | Lee et al. . |
| 5,424,016 | 6/1995 | Kolosowski . |
| 5,585,058 | 12/1996 | Kolosowski . |

FOREIGN PATENT DOCUMENTS

| 0498327 | 8/1992 | European Pat. Off. . |
| 3926446 | 7/1990 | Germany . |
| 57-174225 | 10/1982 | Japan . |
| 2102808 | 2/1983 | United Kingdom . |
| WO 92/19439 | 11/1992 | WIPO . |

*Primary Examiner*—Allan R. Kuhns
*Attorney, Agent, or Firm*—Fisher,Christen & Sabol

[57] ABSTRACT

A board of foamed polyolefin is extruded and is foamed with a blowing agent that can be halogen-free hydrocarbon or $CO_2$. To reduce the content of blowing agent, the board is needle-punched within three hours after extrusion to a perforation depth in the range of 60 to 97% of the board thickness. Such a board has good thermal stability.

10 Claims, No Drawings

METHOD OF FORMING BOARDS OF FOAM POLYOLEFIN USING NEEDLE PUNCHING TO RELEASE BLOWING AGENT

This application is a continuation of prior U.S. application Ser. No. 08/404,264 Filing Date Mar. 14, 1995, now abandoned, and/which is a divisional of application Ser. No. 08/087,404 Filing Date Jul. 8, 1993, now abandoned.

The invention relates to web-shaped boards of foam material produced in a relatively small board thickness from polyolefin molding compositions which contain a blowing agent, especially polyethylene and polypropylene synthetic resin compositions of this type, by extrusion, foaming and expansion of these compositions and finding versatile usage especially as packaging and insulating material.

It is relatively difficult to manufacture uniform foam products of small thickness in endless length and board shape with relatively large widths required for packaging and insulating materials. Special devices and methods have been developed for this purpose, such as described, for example, in U.S. Pat. No. 4,323,528 (Collins). In order to ensure a continuous or discontinuous procedure usable for industrial operation, it is necessary to provide, beside operating conditions of pressure, temperature and extrusion rate specifically adapted to one another, also an exact gradation of the quantitative proportions of polymer composition, blowing or expanding agent, and any other additives that may be optionally included, in the starting material to be processed, to effect adjustment.

The results have been satisfactory as long as halogenated hydrocarbons are used as the blowing and expanding agent. For environmental protection considerations, the utilization of such halogenated hydrocarbons is now no longer desirable and/or no longer permitted. As a replacement for halogenated hydrocarbons, these processes use, at present, halogen-free hydrocarbons, particularly butane, isobutane and/or propane and/or $CO_2$ as the blowing and expanding media in the production of thin polyolefin foam sheeting. In this process, the problem is encountered that, after the formation of the foam material, these blowing and expanding agents will not escape in the desired way from the expanded material. The thus-formed foam sheets must he freed as extensively as possible from the blowing and expanding agents in a subsequently arranged "maturing stage". This can be accomplished by storage and resting over a relatively long period of time, e.g. several weeks, at an elevated temperature or ambient temperature. It is also possible to effect heat stabilization and, for this purpose, to heat the foam sheeting in a device arranged downstream of the extruder for a period of, for example, 30 minutes, to 40°–50° C., for instance to introduce the foam sheeting into an oven set to this temperature. Apart from the fact that these measures consume time and energy, it has been found that there is still a high residual content of hydrocarbon blowing agent remaining in the finished foam material; this has an adverse effect on its thermal stability and the visual appearance of the surface, the so-called skin.

The invention is based on the object of proposing a foam sheeting and board material made up of polyolefin compositions expanded by means of halogen-free hydrocarbons and/or $CO_2$, especially butane, if desired in a mixture with $CO_2$, this material exhibiting, directly after its production, a content of blowing agent reduced by more than 30% and having good mechanical permanent properties.

When manufacturing thin foam boards, approximately with thicknesses of 50 mm to 100 mm, in a device according to a process as known from U.S. Pat. No. 4,323,528, using as the blowing agent, for example, butane in place of fluorochlorinated hydrocarbons (FCHC) the finished foam boards, as has been discovered, exhibit with otherwise identical operating conditions different physical properties than the boards manufactured with FCHC as the blowing agent. The thermal stability, in particular, does not meet the required standard conditions.

It has been found that these disadvantages are caused by the fact that the release of the halogen-free hydrocarbon blowing agents from the foamed material is made difficult. During the foaming of the extruded material, a surface skin in the manner of a so-called elephant skin is formed, probably by the shock effect of the temperature difference of about 105°–115° C. in the extruder head upstream of the die and 20° C. in the surrounding space into which the foam composition is ejected, possibly preventing the exiting of the halogen-free hydrocarbon blowing agent from the solidifying foam composition. Thus, the residual content of blowing agent in the consolidated, ready-for-use foam board material is at a relatively high level and does not diminish during the course of several weeks to such an extent that the required thermal stability is attained. The thermal properties of this material are inadequate.

These inadequacies could be overcome by subjecting the extruded foam board material according to this invention to a needle punching step directly after the material has solidified and has reached its internal stability, approximately within one hour after exiting from the extruder die, maximally 3 hours after extrusion and wherein the needle-punching step is carried out to a perforation depth of 60 to 97% of the board thickness.

This can be accomplished in a simple way by providing in series with the extruder and downstream thereof a device for stitching perforations into the stabilized foam board product. Needle-punching devices which can be used for this purpose are conventional. It is possible, for example, to use a device made up of two rolls wherein the rolls are arranged in parallel to each other and are driven in opposite directions at the same peripheral speed, and wherein one of the rolls is equipped with a rubber covering and the other roll is studded with needles, the axial spacing of the rolls being variably adjustable. The foam board product is guided over the rubber roll, and the board product is needle-punched with the aid of the needles on the counter roll. It is likewise possible to perform the needle-punching step according to this invention by means of conventional devices wherein the needles are mounted to a plate that can be moved vertically and optionally horizontally and is arranged in parallel to the plane of the foam board, this plate being driven with a horizontal velocity corresponding to the take-off speed of the foam web; the needle-punching step is executed simultaneously therewith by a vertical motion in the direction toward the foam web.

The penetration depth of the needles into the foam web can be varied by a corresponding adjustment of the axial spacings in case of the rolls and, respectively, of the lifting height of the needle plate device. The size of the punching holes during the perforating step can be controlled by the thickness of the needles employed. Suitably, needles are used the tips of which have such a length that it corresponds to the maximum penetration depth into the foam board material.

When utilizing needles with a conical configuration of the needle tips, then the size and depth of the punched holes can be controlled by adjusting the needle-punching roll or plate.

It proved to be particularly advantageous to fashion the foam web product according to this invention with needle perforations to a depth of at least 60% and no more than 97% of the board thickness, and with a maximally dense needle-punching pattern. Dense needle-punching and shallow depth penetration result in products comparable to those exhibiting correspondingly sparse needle-punching and maximum punching depth. Under practical conditions, such a foam web product according to this invention proved to be especially advantageous if its perforation depth amounts to between 90% and 97% of the board thickness and its needle-punching density is at least 4,000 needles per $m^2$ of the board surface, and if triangular needles are utilized. However, great care must be taken to avoid complete penetration, which would entirely remove the surface skin of the web product, and render such a product weak and mechanically unstable.

Foam boards and webs according to this invention can be present in the customary dimensions. As is known, board material of polyolefin foam material can be manufactured in gauges (thicknesses) of 0.5 mm to 150 mm and in widths of up to 2 m in a continuous or discontinuous mode of operation. It is possible to use ring-shaped extruder dies with a correspondingly smaller or larger ring gap width through which the molten, expandable viscous composition is extruded.

The thus-formed tubular foam article is then taken off by way of a cylindrical sleeve mandrel as the holding means and is stretched and cut into a web shape as soon as it has gained its internal strength. Flat dies can be selectively employed for the extrusion, and the thus-formed foam product can first be withdrawn between two belts as the holding means and adjusted to the desired dimension. After a take-off path of 2 to 2.5 m, the product can then be deposited on a conveyor belt and can be further taken off thereon over a path length of about 15 m until the product has obtained its inherent strength.

The needle-punching procedure provided in accordance with this invention should take place, in any event, only at the time the foam board or sheeting material has gained adequate internal stability. However, it is then necessary to perform the needle-punching perforation soon. It has been found that, after a relatively long stabilization period, a needle-punching procedure remains without any essential effect on a change in the residual content of halogen-free hydrocarbon blowing agent that has remained in the thus-expanded finished product.

It has been found that a time period of advantageously one hour after extrusion of the foam board product will provide the desired results for the needle-punching perforation. The needle-punching step is to be carried out no later than 3 hours after extrusion; otherwise the obtained results are not at an optimum.

After the needle-punching step, the perforated foam board product of this invention, insofar as not as yet present in the form of individual panels as produced in a batchwise manufacture, is either stored in the form of sheeting material and shipped, or it is cut to dimensions corresponding to the intended usage, lengths and optionally widths, and passed on to further use in the form of such cut-to-size items.

The advantages attained by the invention are apparent especially when working with compositions based on non-crosslinked polyolefins, and foam products are manufactured having a closed cell structure in the foam. In case of products of open-cell foam, the mechanical and physical usage properties leave something to be desired.

Moreover, it is recommended, in accordance with this invention, to provide foam board products having thicknesses of advantageously up to 150 mm since—as has been discovered—the thermal stability is diminished in foam board products of this invention having a thickness larger than about 150 mm so that they are at an optimum only for those usages wherein they are not subjected to any substantial temperature influences.

polyolefins utilized for the purposes of this invention can be homopolymers as well as copolymers of corresponding $C_2-C_8$ monomers, such as ethylene, propylene, butylene, etc., which can be polymerized according to any desired conventional methods, by high-pressure, medium-pressure or low-pressure polymerization. The polymers are advantageously non-crosslinked linear polymers.

As the additives which regulate cell formation and/or cell size and distribution in the foam product, it is possible to concomitantly utilize all compounds known and customary for these purposes during the manufacture of foam board products in accordance with this invention. Such materials are, for example, esters of fatty acids, such as stearates, commercially available in the form of, for example, zinc stearate or also as glycerol esters of stearic acid for these purposes under various trade names (example: "ATMOS", "Radiasurf"). Usually, nucleating agents are also utilized as the additive, for example talc or CaO, likewise obtainable commercially on the market for the present purposes, e.g. under the trade names "MISTROV ZSC"and "Talc de Luzenac".

The foam products of the invention can exhibit pore sizes of 20–36 CpI (number of cells per inch, measured by means of a tabulated magnifying lens on the cutting surface of sections of sample material), foam densities of about 15–65 kg/m$^3$, compressive strengths of 0.06–0.150 N/mm$^2$ at 50% compression stress exerted in accordance with DIN [German Industrial Standard] 53577 (measured upon the fourth compression), and compression set of 10–45% at 50% compression during 22 hours and 2 hours of recovery according to DIN 53572, and thermal stability of <–10% with 24 hours at 70° C. according to ASTM 3575 F.

It has been found that these physical properties in products needle-punched according to this invention are improved or of identical quality as compared with heretofore known products expanded with halogen-free hydrocarbons or halogen-containing hydrocarbons and mixtures with $CO_2$ as the blowing and expanding agent.

EXAMPLE 1

A mixture of 100 parts by weight of granulated low-density polyethylene (LDPE), 1 part by weight of zinc stearate, and 0.5 part by weight of fine-grained talc (or CaO or ZnO) was introduced continuously into the feeding unit of a single-screw extruder of the structure described in U.S. Pat. No. 4,323,528 (Collins) and molten therein during transport by means of the extruder screw to a homogeneous, viscous mass. During its conveying route toward the extruder die head, the molten mass was combined under pressure with butane blowing agent and mixed therewith. The molten mass, uniformly intermixed with the blowing agent, was cooled to a temperature lower as compared with the melting temperature and ejected through a ring-shaped spray nozzle under pressure into the environment. The foaming viscous mass, ejected in ring shape, was conducted over a cylindrical sleeve arranged in front of the spray nozzle and serving as the molding mandrel and thereupon was stretched and cooled off.

After the foamed mass, during its take-off route, had stabilized and assumed adequate internal strength, the tubular foam item was cut open at the end of the mandrel and conducted, as a foam web product, through a needle-punch roll arrangement. By means of the needle-punch roll device, the foam web product was needle-punched.

Tables 1 and 2 set forth below indicate the process parameters and the product properties in detail. The values for the "Comparative Example 1" was determined on a sample of the foam board product manufactured as described hereinabove, this sample having been collected after the cutting of the tubular foam item downstream of the molding mandrel, but prior to introduction into the needle-punching unit.

EXAMPLE 2

The procedure of Example 1 was followed, but using, in place of an annular spray nozzle, a flat die through which the foaming mass was extruded into the environment. The extruded, foaming mass was first guided over a take-off path of about 2 meters in length between 2 belts revolving horizontally in parallel to each other at a spacing corresponding to the thickness of the foam board to be produced; thereafter, the foam product was furthermore transported in the forward direction on a belt over a path length of an additional approximately 15 m. The take-off speed was 1–7 m per minute. After the thus-obtained foam board product had reached its internal strength, it was conducted through a needle-punching roll arrangement as described in Example 1 and needle-punched therein.

Tables 1 and 2 set out below indicate the process parameters and product properties in detail. The values for the "Comparative Example 2" were determined on a sample of the foam board product manufactured as described above, taken after removal of the foam board item from the conveyor belt, but prior to feeding the foam board product into the needle-punching unit.

EXAMPLE 3

The procedure was carried out essentially as described in the preceding examples, but the molding step was conducted discontinuously, in batchwise fashion, rather than continuously (accumulation process). For this purpose, the intermixed and molten mass was introduced into a dwell chamber arranged downstream of the extruder screw wherein temperature and pressure were adjusted to each other in such a way that foaming of the mixture was prevented. From the dwell chamber, the amount of mixture contained therein is ejected through the spray nozzle at time intervals in cycles by means of a plunger. With ejected quantities of 2,000–4, 500 kg/hour, attained by means of extrusion cycles of 3–12 seconds with dwell chamber capacities of 3–25 kg, foam boards were produced with lengths of 0.5–12 meters.

The further product properties are set forth in Tables 1 and 2 below. The values for the "Comparative Example 1" were determined on a sample of a foam board, produced as described above, taken after removal from the conveyor belt but prior to feeding into the needle-punching unit.

Foam boards and sheeting according to this invention have the advantage that they can be manufactured directly in a simple way in correspondence with the given specifications regarding thermal stability.

Furthermore, they exhibit an excellent surface character; there is no surface roughness.

In the foam webs and boards according to this invention, the amount of blowing agent content is substantially lower, being more than 30% below that of foam products obtained according to the same manufacturing methods but without the needle-punching step performed on products according to this invention. Moreover, foam products of this invention exhibit the advantage that their "maturing process" takes place within substantially shorter time periods and without the consumption of thermal energy; for example, instead of (as previously) 14 weeks at 50° C., a "maturing time" is to be provided of one week at ambient temperature.

TABLE 1

Extrusion Process Parameters in the Process of Examples 1, 2 and 3

| | |
|---|---|
| Feeding speed into the extruder | 60–350 kg/hour |
| Melting temperature | 130–200° C. |
| Melting pressure | 65–210 bar |
| Feeding pressure for gaseous blowing agent | 80–250 bar |
| Temperature during feeding of gaseous blowing agent | 175° C. |
| Temperature of molten mass prior to extrusion and foaming | 100–125° C. |
| Molding pressure | 35–200 bar |
| Ejection rate | 250 kg/hour–4000 kg/hour |
| Take-off speed from spray nozzle | 1 m/min–100 m/min |
| Ambient temperature in ejection chamber | 18° C. |
| Pressure in ejection chamber | 1 atmosphere |

TABLE 2

Properties of Manufactured Foam Products

| | Example 1 | Example 2 | Example 3 |
|---|---|---|---|
| Thickness of foam board | 4 mm | 50 mm | 100 mm |
| Width of foam board | 2.00 m | 0.60 m | 0.60 m |
| Needle-punching density | 5000 needles per m$^2$ | 10000 needles per m$^2$ | 20000 needles per m$^2$ |
| Perforation depth | 3.7 mm | 48 mm | 90 mm |
| Content of blowing agent (butane) | | | |
| prior to needle-punching | 5.5% | 3.8% | 3.8% |
| directly after needle-punching | 3.5% | 2.5% | 2.7% |
| after 1 day | 1.5% | 2.0% | 2.2% |
| after 7 days | 1.4% | 1.8% | 1.8% |
| after 2 weeks | 1.3% | 1.2% | 1.3% |
| after 7 weeks | 1.2% | 1.1% | 1.2% |

| | Comparative Example 1 | Comparative Example 2 | Comparative Example 3 |
|---|---|---|---|
| Butane content | | | |
| directly after consolidation | 5.5% | 3.8% | 3.8% |
| after 1 day | 3.0% | 3.5% | 3.5% |
| after 7 days | 2.8% | 3.4% | 3.4% |
| after 2 weeks | 2.5% | 3.4% | 3.4% |
| after 7 weeks | 2.2% | 3.4% | 3.4% |

What is claimed is:

1. A process for the production of a foam board, comprising extruding or ejecting polyolefin foamed with a blowing agent selected from the group consisting of halogen-free hydrocarbon and $CO_2$ to the shape of a board, and, between about one hour and about three hours after extrusion or ejection, needle-punching at least one surface of the board to a perforation depth in the range of 60 to 97 percent of the board thickness.

2. A process according to claim 1, wherein the needle-punching density is at least 4,000 punches per square meter of board surface area.

3. A process as claimed in claim 1, performed on a foam board having a thickness of 50 to 100 mm, and performing the needle-punching to a depth of 30 to 97 mm and a needle-punching density of 4,000 to 20,000 punches per square meter of board surface area.

4. The process according to claim 1 wherein the polyolefin is polyethylene.

5. The process according to claim 1 wherein the polyolefin is low density polyethylene.

6. The process according to claim 1 wherein the blowing agent is isobutane.

7. The process according to claim 1 wherein a nucleating agent is incorporated into the polyolefin to be foamed.

8. The process according to claim 1 wherein an additive which regulates cell formulation or cell size or both and cell distribution in the foam board, is incorporated into the polyolefin to be foamed.

9. The process according to claim 8 wherein the additive is an ester of a fatty acid.

10. The process according to claim 8 wherein the additive is zinc stearate.

* * * * *